Nov. 4, 1941.  E. W. HAWK  2,261,252
RADIO CONTROL SYSTEM FOR MOVABLE MAPS
Filed Oct. 9, 1939   5 Sheets-Sheet 1
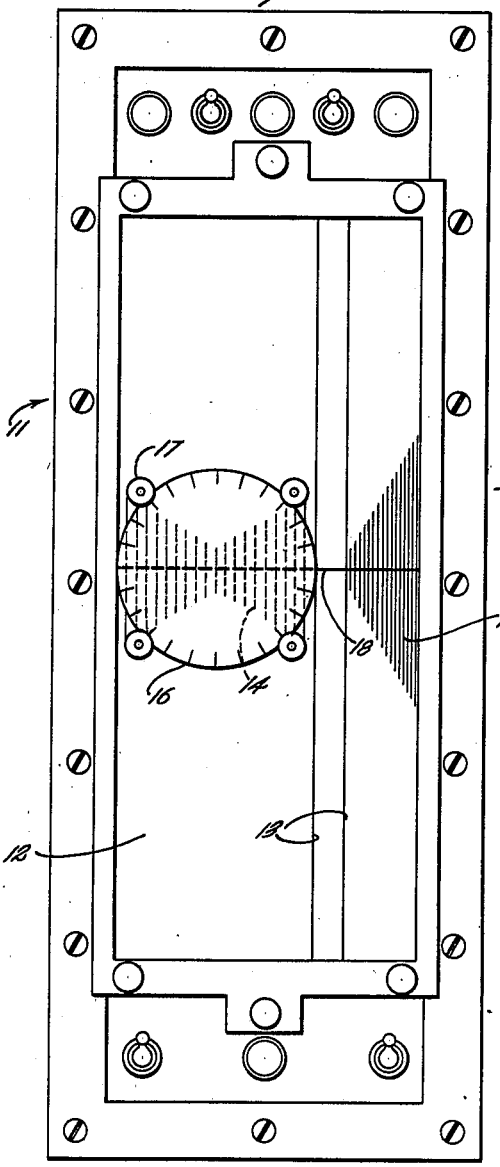
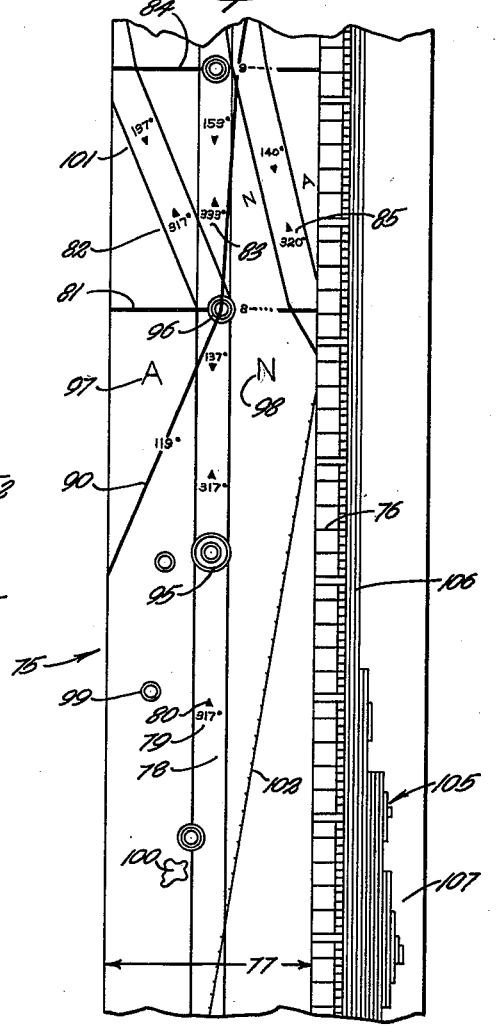
Inventor
EUGENE WILLIAM HAWK
By Hazard and Miller
Attorneys Nov. 4, 1941.  E. W. HAWK  2,261,252
RADIO CONTROL SYSTEM FOR MOVABLE MAPS
Filed Oct. 9, 1939  5 Sheets—Sheet 2

Inventor
EUGENE WILLIAM HAWK
By Hazard and Miller
Attorneys

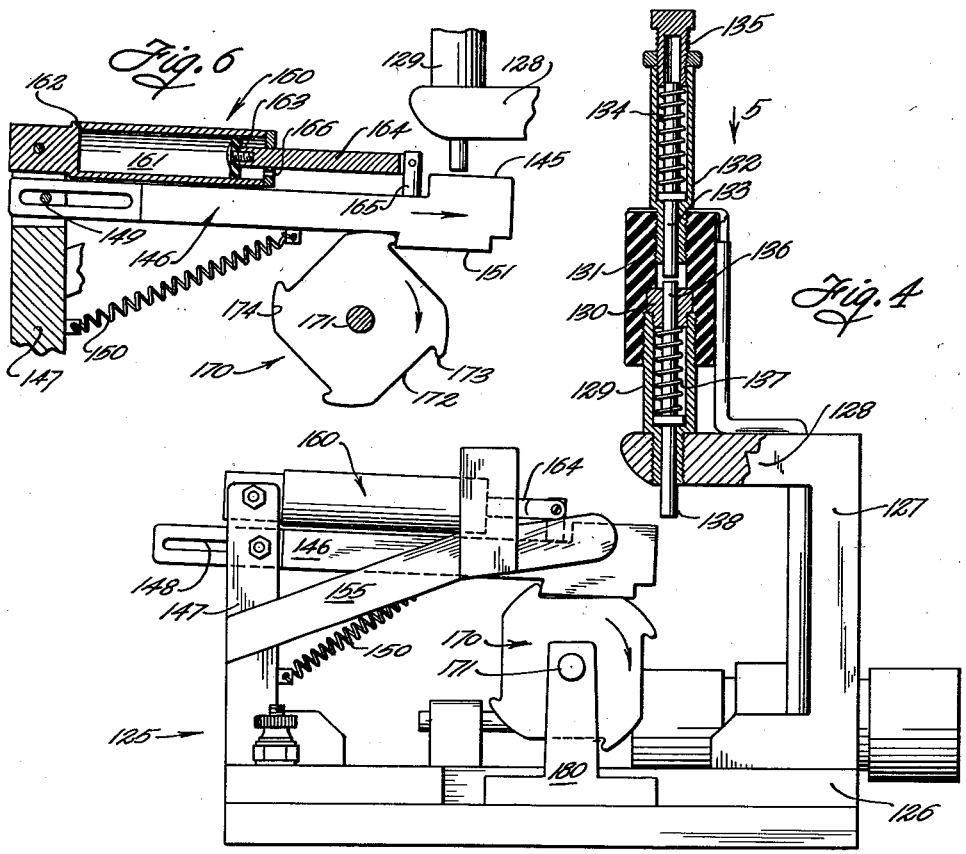

Nov. 4, 1941.  E. W. HAWK  2,261,252
RADIO CONTROL SYSTEM FOR MOVABLE MAPS
Filed Oct. 9, 1939  5 Sheets-Sheet 4

Inventor
EUGENE WILLIAM HAWK
By Hazard and Miller
Attorneys

Nov. 4, 1941.  E. W. HAWK  2,261,252
RADIO CONTROL SYSTEM FOR MOVABLE MAPS
Filed Oct. 9, 1939  5 Sheets-Sheet 5
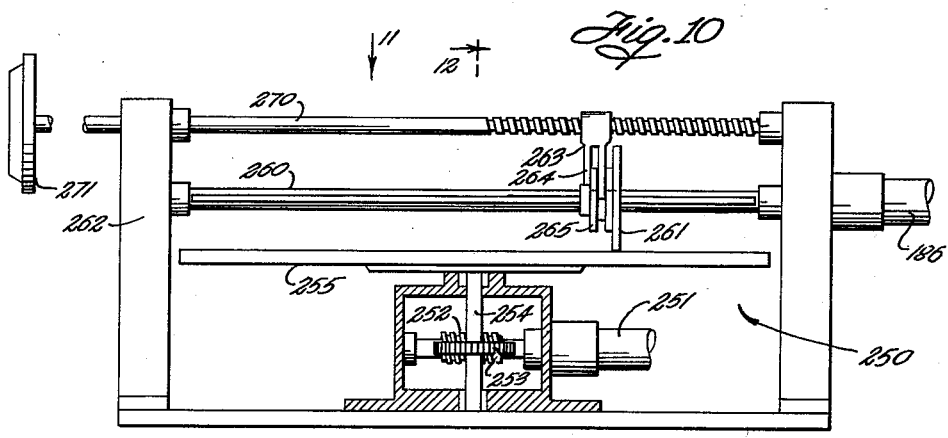
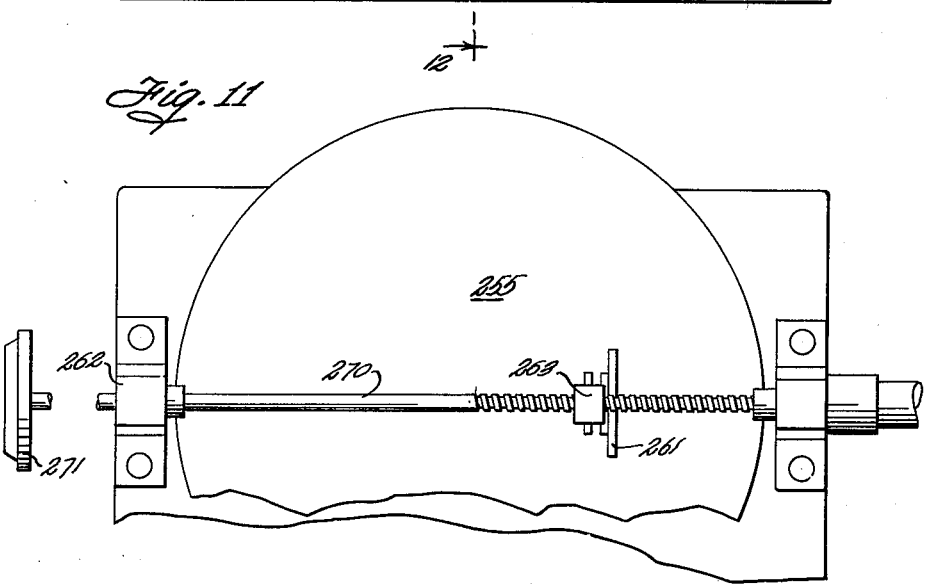
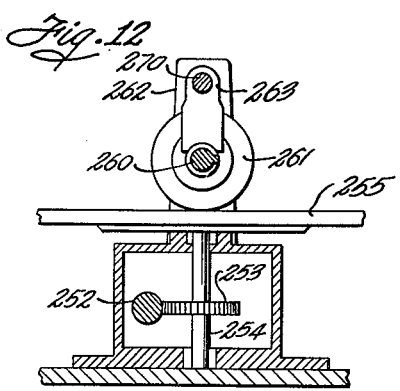
Inventor
EUGENE WILLIAM HAWK
By Hazard and Miller
Attorneys Patented Nov. 4, 1941

2,261,252

UNITED STATES PATENT OFFICE 2,261,252

RADIO CONTROL SYSTEM FOR MOVABLE MAPS

Eugene William Hawk, Los Angeles, Calif., assignor of thirty-five per cent to James L. Read, Los Angeles, Calif., as trustee for himself and for Paul S. Read, Omaha, Nebr., and thirty-two and one-half per cent to Leslie C. Isom, Los Angeles, Calif.

Application October 9, 1939, Serial No. 298,677

17 Claims. (Cl. 250—2)

This application presents an invention in an improvement particularly adapted to the navigation of airplanes on commercial routes, particularly over land or land and sea having distinct fixed markings of the course in order that the dispatcher and the pilot or navigator may be able to determine by a moving map strip the location of the airplane on its particular route.

In the operation of commercial airplane lines these have distinct routes over the ground and in some cases partly over the seas and certain islands in which the route to be followed is quite definitely mapped which maps usually show the main topographical features, the location of the commercial and emergency landing fields, the navigational beacons, the direction of the radio guidance beacons, and also the location of the radio station beacons and other aids to aid the airplanes on their substantially definite and predetermined route.

My invention takes cognizance of these features and by use of a moving strip map on the airplane and in the dispatcher's office the dispatcher is continuously apprised of the location of the airplane on its route. For this purpose in the airplane I provide a strip map made to a suitable scale with a mechanism for advancing the map in conformity with the traveling of the airplane, and in particular actuated to shift the map at a rate proportional to the speed of the airplane over the ground so that at any particular instance the location as shown on the map checks approximately with the location of the airplane over the predetermined course as mapped.

In conjunction with the moving map on the airplane, another feature of my invention includes a radio transmitter preferably of the short-wave type which sends out a signal, the timing of which is in synchronism with the movement of the map and thus with the travel of the airplane over its course.

A characteristic of the particular signal is that this is of an intermittent character but the time period during which the radio signal is transmitted is constant, thus transmitting sufficient radio energy for predetermined time periods. The length of the time periods of the transmission impulses while constant is to a certain extent controlled as to the rapidity of the repeating signals, dependent upon the speed of the vehicle. In this construction, of course, a greater number of signals are transmitted when the airplane is traveling at a high speed than when traveling at a low speed.

A further feature of my invention includes a second and similar movable strip map at the dispatcher's office, the advance of such map being controlled by the radio signals received from the transmitter on the airplane. Thus, at each instance that the map is advanced on the airplane the second and corresponding map at the dispatcher's office is also advanced the advance in both cases being of the same amount. Therefore, the dispatcher may by observing his map determine at any time the approximate location of the airplane over the predetermined mapped course or route. Manifestly, therefore, when the airplane is traveling at high speed the map in the dispatcher's office is advanced more rapidly than when the airplane is traveling at a low speed relative to ground, that is its mapped course.

In order that a suitable type of map may be utilized my invention in addition comprises a physical construction of a strip map in which the course to be followed by the airplane is shown as a straight longitudinal line extending longitudinally of the map and preferably along the center line no matter whether the airplane course as mapped shows angular turns or not. These angular turns and the course are indicated on the map, the map showing either the compass or the true meridian and latitude direction of the sections of the course.

A further characteristic of the map is that this illustrates the position and direction of the various radio navigation beams, the location of the vertical beams to identify location, and also the succession of airplane beacons where practical. This strip map, in addition, shows certain topographical features having mainly to do with mountains, landing fields, and the location of cities and towns. A further characteristic of the map is that it sets forth a profile showing the elevation to which the airplane must climb to give adequate clearance over mountains, etc.

Another feature and instrument of my invention relates to the ground speed operating and if desired, ground speed indicating device, which may have a shaft rotatably driven by a suitable type of air speed indicator. In conjunction with such shaft my invention includes a speed control by which the pilot may increase or decrease the speed of a driven shaft or the like depending upon the wind condition through which he is flying. Thus, if he is flying through still air, the air speed indicator will give the approximate ground speed, however if he is flying with a tail wind or into a head wind with the same engine and propeller speeds, he would obviously be flying with the tail wind at a higher ground speed and against the head wind with a smaller ground speed. The pilot therefore has under his control a friction or gear drive from the air speed indicator to give the approximate ground speed irrespective of the direction and velocity of the wind through which he may be flying.

My invention is illustrated in connection with the accompanying drawings, in which:

Fig. 1 is a front view of the moving map cabinet taken in the direction of the arrow 1 of Fig. 2, illustrating a transparent window through which the map is viewed together with a scale of linear and vertical measurements together with a rotatable protractor.

Fig. 3 is a face view of a section of a typical map constructed in accordance with my invention.

Fig. 4 is a side elevation taken in the direction of the arrow 4 of Fig. 5 of the constant time period circuit closer for the radio signal, parts being broken away.

Fig. 6 is a part elevation and part longitudinal section through the dash pot assembly taken on the section line 6—6 of Fig. 5 in the direction of the arrows showing the timing cam in one position of operation.

Fig. 7 is a partial view similar to Fig. 6 showing the timing cam in another position.

Fig. 10 is a side elevation partly broken away taken in the direction of the arrow 10 of Fig. 11 of the timing control for the moving map and the radio transmitter.

Fig. 11 is a plan taken in the direction of the arrow 11 of Fig. 10 partly broken away.

Fig. 12 is a vertical section on the line 12—12 of Fig. 10 in the direction of the arrows.

Figure 2:
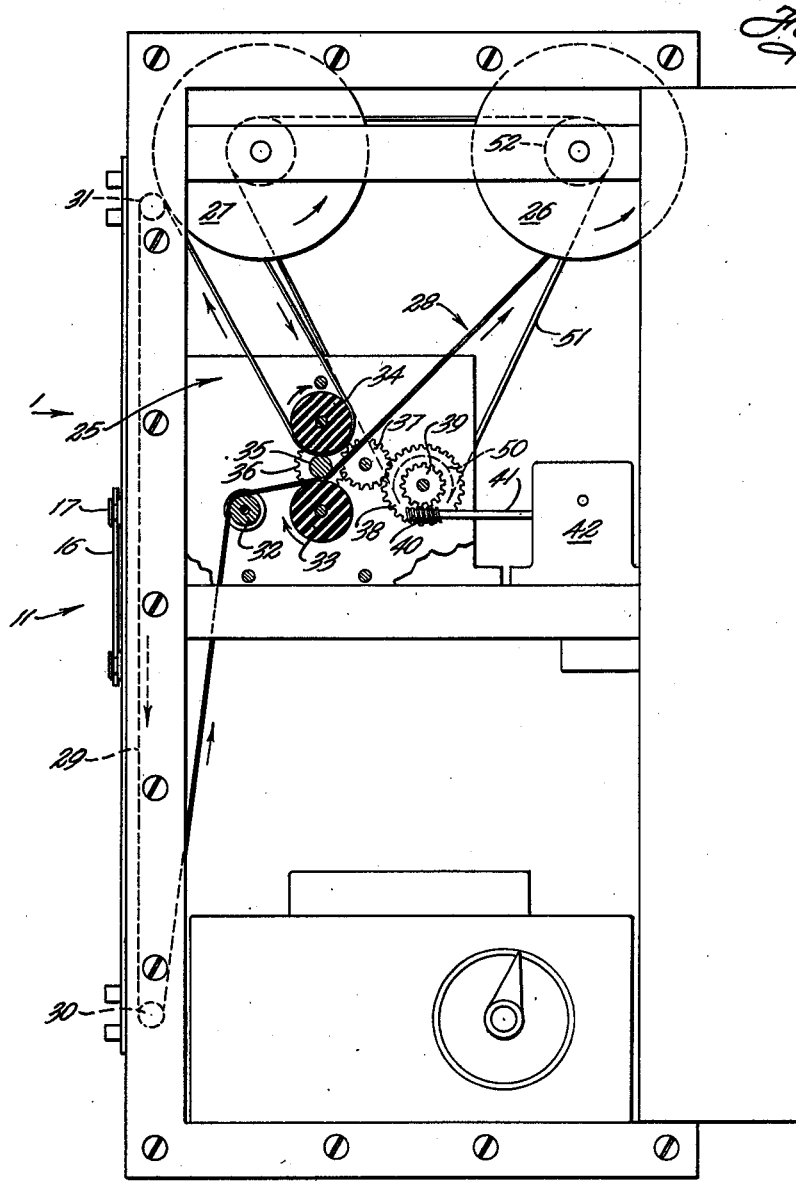
Fig. 2 is a side view of the cabinet taken in the direction of the arrow 2 of Fig. 1 with the side door open exposing the internal feed mechanism for the moving map.

Dealing first with the construction of Figs. 1, 2 and 3 of the map moving cabinet, such cabinet as a whole is designated by the numeral 11 having a suitable base, side and back walls, a top and with a transparent window 12 on the front. This window may be hinged if desired to open and close. For sake of clarity the map is not shown through the window. The window is ruled with a pair of parallel lines 13 extending from the bottom towards the top through which a scale of longitudinal distance on the map usually graduated in miles or suitable scale may be read. There are a series of transverse graduation lines 14, these also running vertically and indicating mileage distance on the map considered transversely across such map. At one margin of the window there is a vertical graduation in parallel lines indicated at 15, this representing elevation as in feet above sea level or if desired above the adjacent ground plane. A rotatable protractor 16 is mounted on the face of the window being retained in place by four small rollers 17 so that the protractor is located in front of the window glass. A datum line 18 is drawn across the glass preferably intersecting at transverse graduations 14, the elevation scale 15 and intersects the center of the protractor 16. This line represents the line on which the plane is located as the map moves concurrently with the movement of the aeroplane.

The equipment for moving the map may be any suitable desired arrangement for either continuously or step by step moving a strip map. The strip map moving assembly is designated by the numeral 25, note Fig. 2, in which the reel 26 is indicated as winding in the map and the reel 27, as unwinding such map. These reels are mounted on suitable axles and are shown located in the upper part of the cabinet. The strip may designated by the numeral 28 has a face portion 29 moving downwardly back of the window 12. The direction of travel is illustrated by the arrows. The map is guided over rollers 30 at the bottom and 31 at the top and a further portion over the idler 32. The strip map is positively driven by a feed between rubber covered feed rollers 33 and 34 which engage the periphery of a driven feed roller 35 preferably formed of metal. This metal roller 35 is driven in any suitable manner and thus simultaneously feeds the map from one of the reels towards the window and back towards the other reel. In a particular gear train illustrated, a gear 36 is connected to the metal roller 35. This meshes with an idler gear 37, the latter is driven by a driving gear 38, this latter being connected to a worm gear 39 driven by a worm 40, this latter being actuated by a shaft 41 driven by an electric motor 42 or the equivalent. The reels are actuated by providing a pulley 50 over which operates a slip type of belt 51 and this passing over complementary pulleys 52 on the reels. The pulley 50 is connected to and driven in conjunction with the gears 38 and 39 and the belt 51 is of a type provided for slippage such as the helically coiled wire belt. This operates the reels in a sufficient manner to take up on the map as it is fed to the reel and to discharge the map from the other reel, the slip compensating for the difference of diameter of the rolled map on the reels.

The strip map of Fig. 3 designated by the assembly numeral 75 has the following characteristics: a scale 76 being a longitudinal measure in miles or the equivalent is ruled longitudinally of the strip intermediate the edges. This leaves a face section 77 giving certain topographical features of the terrain over which the aeroplane course is laid together with the various guiding beacons, etc. A center band 78 is defined between two lines preferably in the center of the map and where the aeroplane is to fly on a radio beacon, such beacon is illustrated as coincided with the band. For instance in the lower portion of the section of the map a compass bearing such as 317 degrees indicated at 79 and the directional arrow 80 indicate a radio beam, the source of which is not shown on which the aeroplane is to fly as it is presumed that the plane is flying as to the map from the bottom towards the top, therefore the map is moved downwardly as above mentioned in the cabinet past the window. The cross line 81 represents a section of the map where the plane deviates from the radio beam indicated at 79 and 80. This original beam is shown divergent as at 82. The plane then follows another beam designated 83 having the compass bearing of 333 degrees with the arrow pointing upwardly, the source of this latter beam is not indicated. The course on the beam 83 is flown until another transverse line 84 is shown on the map when the aeroplane comes into the field of a third radio beam 85 indicated by the compass bearing 320 degrees with the arrow. This is at the upper section of the broken map.

The map also has a heavy ruled line 90 which defines a true meridian bearing, this being shown as 119 degrees. In view of the course changing at the line 81 and 84, this heavy meridian line also changes its angle. It indicates to the pilot his relation to this meridian course. It is to be understood that if the course is mainly east and west, this heavy line may indicate a parallel of latitude. The map indicates prominent features having to do with the navigation of the areoplane in which a main radio control station is indicated at 95. This may be the station sending out the beam indicated 79, 80 and 82. At the line of change of course 81, there is indicated a radio control station 96, this being indicated as having a vertical or cone beam to show where the change of course takes place. The map is provided with the letters A, 97, and N, 98, which are call letters from the station transmitting the navigation beam and indicate to the pilot whether he is on or off the beam. Various other features of topography are shown such as towns or landing fields 99, a lake 100 and other details may be shown. The map has reverse readings on the beams indicated at 101 showing 137 degrees with a downwardly pointing arrow, this giving the reverse reading of a beam when flying in the opposite direction relative to the map, that is, from the top towards the bottom in which case the map would be presumed as moving upwardly as to the front of the cabinet. All of the radio beams are marked with their reverse readings. Prominent features of the topography which may be of a guide are shown, a railroad track being indicated at 102. Manifestly in a finished map many other features are exhibited but for sake of clarity the elevation contours are preferably omitted. These contours are shown at the side of the map indicated at 105 and may be graduated in a suitable vertical scale preferably from a sea level and in this case an extensive plain is indicated at 106 and a mountain range at 107. These become exhibited on the map long prior to the particular features of the ranges coming into alignment with the course line 18 on the window and apprise the pilot that he must acquire sufficient elevation. It will be noted that the map does not have any transverse scale of distance but this is given by the transverse distance graduations 14 on the window glass 12 so that by observing the ground over which he is flying and noted points such as radio or light beacons, the pilot can determine how many miles he is flying to one side or the other of his center or true proper course.

The radio timer of Figs. 4 to 7 and designated by the assembly numeral 125 is for the purpose of giving a radio signal of constant duration no matter how rapidly the signal is repeated, that is, when the areroplane is travelling slowly over the ground the signal is repeated slowly and when travelling fast, repeated much more frequently but the time period of the duration of the actual signal is constant, this being for the purpose of transmitting sufficient energy to operate through the medium of relays the moving map at the dispatcher's office. In the construction a suitable frame 126 is shown as having a standard 127 with an arm 128 on which arm there is mounted a metal tube 129 having a metal guide block 130 at the top. An insulating bushing 131 is secured to the metal tube and to the guide 130 and itself supports a complementary metal tube 132. In this tube there is an upper slidable contact pin 133, this being depressed by a spring 134 bearing against a closure plug 135 threaded to the upper end of the sleeve 132. The lower contact pin 136 is also normally depressed by a spring 137, the lower end 138 of the pin 137 extends below the arm 128 and is in a position to be engaged by the surface bearing end 145 of a sliding arm 146.

This arm is mounted on a support 147, the arm having a slot 148 through which extends a pin 149. A spring 150 normally retracts the arm. Such arm has a lug 151 on its underside, this being provided with an inclined tooth 152. The arm is guided in its movement by a bracket 155 so that it has a straight line motion except for a slight up and down oscillation relative to the pin 149. The purpose of the moving arm is to develop a time control indicated by the assembly 160 which has a dash pot 161 with a graduated air orifice 162, the piston 163 has its piston rod 164 pivoted to a stud 165 extending upwardly from the main portion of the rod 146. Therefore on account of the tension of the spring 150 urging the retraction of the rod and the piston into the dash pot, the rate of return is controlled by the orifice 162 for the outlet of air. The air is expelled through an orifice 166 when the rod is being thrust upwardly. The movement of the rod is controlled by a speed responsive cam 170, this being illustrated as mounted on a shaft 171. This is illustrated as a square type of cam having the flat sides 172, the operating tooth 173 and the rise or lift surface 174. The cam rotates in the direction of the arrow as indicated.

The operation of the cam in first engaging the rod is shown in Fig. 4 in which the underside of the lug 151 contacts substantially one of the flat faces of the cam. The tooth 173 of the cam is in this position of Fig. 4 beginning its engagement with the complementary tooth 152 of the lug 151. A further movement outwardly is indicated in Fig. 6 in which it will be seen that the upper surface 145 is advanced a considerable distance under the lower end 138 of the contact pin 136. As soon as the teeth on the cam and on the lug release, the bar is raised on the lift section 174 of the cam which brings the surface 145 into engagement with the lower end 138 of the lower pin lifting this upwardly to make a contact with the lower end of the upper or shifting pin 133. The spring 150 is now free to retract the arm 146 but the arm is maintained in its raised position therefore maintaining the electrical contact between the pins 136 and 133. This time period is regulated by the timing assembly 160 of the dash pot so that this time is always of the same length no matter whether the cam 170 is rotating slowly or at a high speed and its rate of rotation is controlled by the speed of flight of the areoplane. The electric circuit features of the contact pins 133 and 136 are given in the electrical diagram.

The speed responsive cam 170 (note particularly Figs. 4, 5, 6 and 7) is operated by the mechanism hereunder described. My invention however is not limited to the specific details shown. It will be noted the shaft 171 is journalled in suitable bearings 180 and has a driven extension 181 with a worm gear 182. This is rotated by a worm 183 on a suitably journalled worm shaft 184. This shaft has a coupling 185 to which is connected a rotary shaft or rotating cable 186, this latter being driven by mechanism operated in conjunction with the speed of the aeroplane through the air but compensated to operate at an approximately correct relation to the ground speed of the aeroplane, that is, the speed of travel over the actual ground and in relation to the moving map.

Figure 8:
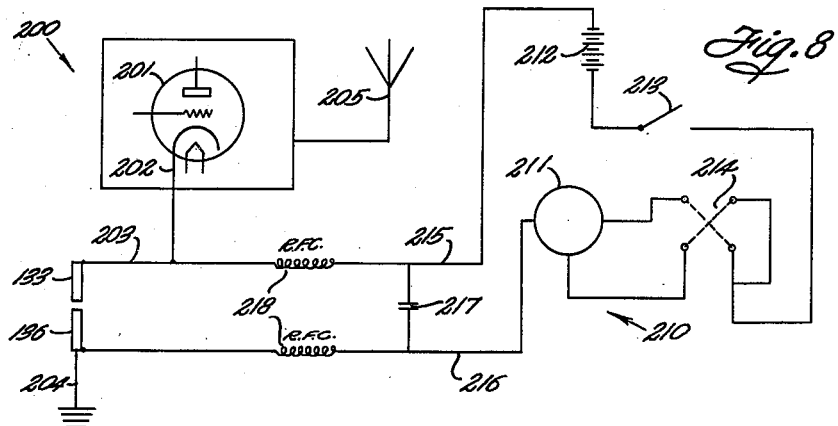
Fig. 8 is an electrical diagram of the radio transmission circuit and of the electric operation of the pilot's map.

As above mentioned, suitable types of radio transmission which give a constant time of actual transmission may be utilized with my equipment together with suitable compensating means to give approximately the ground speed of the aeroplane irrespective of the direction of the wind. In Fig. 8 I illustrate in diagram a radio transmitter 200 in which one of the stages is indicated at 201 by a conventional radio tube. This has a cathode 202 connected by a lead 203 to the upper contact pin 133 shown in detail in Fig. 4. The lower and cam operated pin 136 is connected by a lead 204 to a ground of the radio set. The various stages of amplification and of the power tube are not shown in the radio transmitter but the output, that is, the signal emanates from the antenna 205. This gives a broadcast of the desired short wave signal always of a constant duration as to its time.

The moving map in the aeroplane preferably in the navigator's or pilot's cabin is operated by a circuit indicated at 210. This illustrates a motor 211, a source of power 212, the connections through a main opening and closing switch 213, a reversing switch 214 to reverse the direction of the motor. The contact pins 133 and 136 (Figs. 4 and 8) as above described, close the radio transmitting circuit periodically and for uniform time periods of closure. These pins are also utilized to close the motor circuit to move the map during the time the radio transmitter is closed. The motor circuit, presuming the main switch 213 is closed, employs the electric leads 215 and 216, 215 including part of the radio connection lead 203 and through the contact pins 133 and 136 when these are in closed position. In order to block interference of the motor and radio transmitter circuits a condenser 217 is bridged across the leads 215 and 216 and in both of these leads there are radio frequency choke coils 218. By this circuit it will thus be seen that during the time period that the signal is being broadcast by the closed contact between the pins 133 and 136, the motor 211 is also energized and moves the map in the aeroplane, this being constructed and operated as described above in connection with the map moving equipment.

Figure 9:
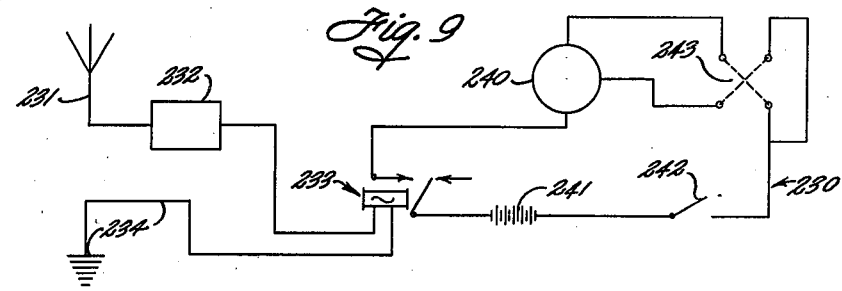
Fig. 9 is an electrical diagram of the receiving station showing the radio receiver and the electrical operation of the map at the dispatcher's office.
Figure 5:
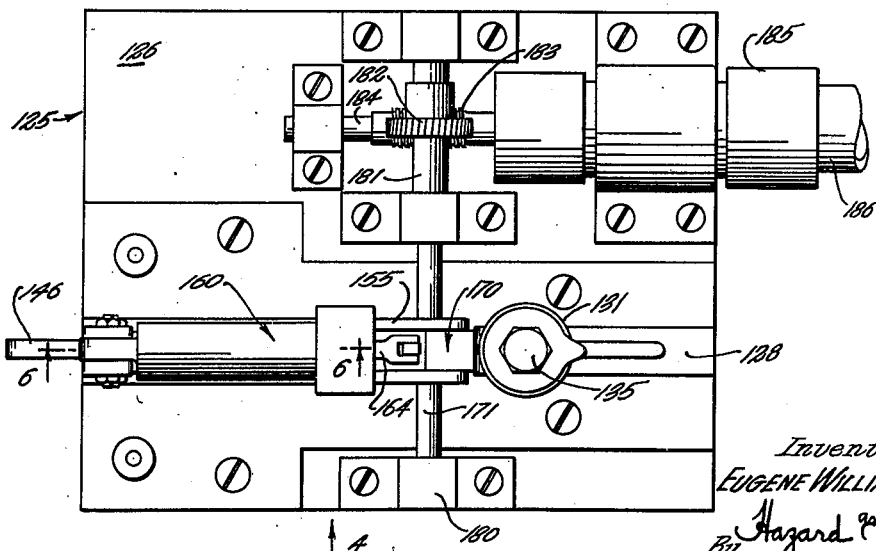
Fig. 5 is a plan taken in the direction of the arrow 5 of Fig. 4.

The receiving circuit and operating mechanism at the dispatcher's office is indicated in Fig. 9 and designated by the numeral 230. This has the receiving antenna 231, a radio receiving set 232 not illustrated in detail. This has proper amplification and the output operates a relay 233, this relay having one side grounded as indicated at 234. The motor 240 is illustrated as operated by a source of power 241 shown as a battery, the connections through the relay through a main opening and closing switch 242 and a reversing switch 243. This latter allows changing the direction of the motor and hence the direction of movement of the strip map. It will thus be seen that during the time periods that the radio signal is being received the relay is closed and therefore the motor is energized thus moving the map for a predetermined short time period at the dispatcher's office. From a description of the mechanism in the aeroplane its map is also simultaneously moved, therefore both maps are moved at the same time and the same distance, thus the pilot can ascertain his position of flying relative to his own map and the dispatcher by interpreting his map may also note the aeroplane as being at the same position.

As above mentioned, the operating cam 170 of Figs. 4, 6 and 7 is utilized to close the circuit of the radio transmitter by making the contact of the movable points 133 and 136 and in addition these points cause the make and break of the circuit energized electric motor for moving the map on the aeroplane. This cam or the equivalent may be actuated in any suitable manner to be driven at a speed proportionate to the travel of the aeroplane over the ground. In Figs. 10, 11 and 12, I illustrate a suitable friction gear drive by which the pilot or navigator may compensate for flying with or against the wind or diagonal winds compared with the speed through still air. In this construction the gear assembly is indicated by the numeral 250. In this instance a shaft 251 is connected to and driven by a suitably actuated air motor or some device which gives a speed through the air. If desired it may be connected to the engines where it is known that at designated color speeds the aeroplane will travel through still air at a known rate. I do not illustrate the particular drive connection for the shaft 251 as this forms no immediate part of my invention and I may use equipment now known. In the illustration the shaft 251 may be considered as a driving shaft so far as the gear train is concerned and has a worm 252 thereon driving a worm gear 253 mounted on a vertical shaft 254. This shaft has a friction disk 255 on its upper end, the vertical shaft 254 and the shaft 251 having suitable journals. A splined driven shaft 260 is mounted in suitable journals and has a friction wheel 261 slidably mounted on the shaft provided with a key fitting in the splines. A suitable frame such as 262 is illustrated for mounting the shaft 260. In order to shift the friction wheel 261 longitudinally of the shaft, I provide a screw threaded yoke 263 which has fingers 264 engaging on opposite sides of a collar 265 to secure to the friction wheel 261. This may have one finger engaging a reduced neck if desired. A speed regulating screw feed shaft 270 is also journalled in the frame and has its threaded portion meshing with the threaded yoke 260 and 263. This shaft 270 has a manually operated register dial 271 which is calibrated as to the component velocity of winds, the components being resolved to direct head and tail winds or if desired the scale in graduations may take into consideration diagonal or quartering winds.

The pilot or navigator by knowing the velocity of for instance a head wind, a tail wind or the component of diagonal winds resolving as to a fore and aft direction, may set the dial and hence the shaft 270, thus shifting the yoke 263 and the friction wheel 261 to compensate for head or tail winds. It is presumed that in the position illustrated the friction wheel 261 is set to rotate the shaft 260 at the desired speed when the aeroplane is travelling through still air and hence the air speed is equal to the speed over the ground of the aeroplane, then if the aeroplane is travelling with a tail wind, as the speed over the ground increases, the dial 271 must be set to give the proper increase in speed of the shaft 260. Likewise if the plane is travelling into a retarding head wind, the dial 271 is likewise set and the speed of the shaft 260 retarded. For sake of simplicity of illustration, the shaft 260 is shown as driving the flexible or equivalent shaft 186 which operates the cam 170 through the gear train of Figs. 4 through 7. It will hence be seen that the pilot or navigator may have an accurate control of the rate of operation of the timing cam and hence of the moving map and the frequency of repetition of the radio signals transmitted. Therefore should the pilot or navigator by navigational or ground observation find that the map in the cabinet of the aeroplane does not accurately show the position of the aeroplane but the aeroplane is approximately over its course, manifestly the speed of the gear train and shaft 260 may be accelerated or retarded in order to speed up or retard the map and in fact, if desired, the map may be reversed in its movement, hence on proper instructions to the dispatcher's depot to reverse his motor and map, the map in the dispatcher's depot will be moved in synchronism with that on the aeroplane to correct any errors discovered by the pilot or navigator. It is of course obvious that the shaft 251 may be driven in any suitable manner and in some cases it may be desirable to have this manually operated by a pilot or navigator to shift the map in accordance with the observations of the navigator. My invention considered broadly comprehends having a map and a position indicating device on an aeroplane to designate the location of the aeroplane in reference to the map. A relative movement is established between the map and the position indicating means by a suitable device or mechanism. Interconnected with the aeroplane locating means as to the map and the position indicator, my invention includes the radio transmitter which operates at desired intervals of time and preferably for designated time periods. This radio signal is thus a control signal to the dispatcher's depot. It is obvious that if desired the map and the position indicator may be relatively moved by some manual device and the radio transmitter operated in some type of a synchronous manner to send out the desired control signals to the dispatcher. It is obvious that although my invention has been described as relating principally to aeroplane travel and navigation, it is apparent that a similar or equivalent construction may be used in connection with the travel of vessels, particularly those following inland waters and a regular route. It may also be used in connection with land transports such as long distance stage or bus service. In this latter case frequently the dispatchers do not know the location of the busses en route until the operator makes a telephone connection at stopping points. Similar equipment may also be utilized in connection with bus services in cities and towns, street car service and the operation of railway trains.

Various changes may be made in the details of the construction without departing from the spirit or scope of the invention as defined by the appended claims.

I claim:

1. In a device of the type described, a vehicle having a first map suitably mounted, a first means to indicate the position of the vehicle in reference to the map, means to relatively move the map and the position indicating means proportioned to the advance of the vehicle and thus indicate the changing positions of the vehicle as to the map, means on the vehicle to transmit a sequence of radio signals correlated with the means to relatively move the map and the position indicating means, a second map constructed and adapted for mounting at a ground depot, a second means to indicate the position of the vehicle on the second map and means controlled by the received radio signal at such depot to relatively move the second map and the second position indicating means to indicate at the depot the same change of position of the first map and the first indicating means on the vehicle.

2. In a device of the type described, a vehicle having a first map suitably mounted, a first means to indicate the position of the vehicle in reference to the map, means to relatively move the map and the position indicating means proportioned to the advance of the vehicle and thus indicate the changing positions of the vehicle as to the map, means on the vehicle to transmit a sequence of radio signals correlated with the means to relatively move the map and the position indicating means, a second map constructed and adapted for mounting at a ground depot, a second means to indicate the position of the vehicle on the second map and means controlled by the received radio signal at such depot to relatively move the second map and the second position indicating means to indicate at the depot the same change of position of the first map and the first indicating means on the vehicle, the first and second maps each being movable in reference to its position indicating means, means on the vehicle to transmit the radio signals in synchronism with definite movements of the first map, the radio signal control means at the depot being associated with means for moving the second map at the depot in synchronism with the movement of the first map on the vehicle.

3. In a device of a type described, a vehicle having a first movable strip map, means to move such first map distances proportioned to the speed of the vehicle, a first means to indicate the position of the vehicle in reference to the first map, means to transmit a sequence of radio signals from the vehicle proportioned to the speed of the vehicle and the movement of the first map, a second and similar movable strip map constructed and adapted for location at a ground depot, a radio receiver at such depot, means controlled by the received signal from the transmitting means on the vehicle to move the second map in synchronism with the movement of the first map and a second means at the depot to indicate the position of the vehicle in reference to the said second map.

4. In a device of a type described, a vehicle having a first movable strip map, means to move such first map distances proportioned to the speed of the vehicle, a first means to indicate the position of the vehicle in reference to the first map, means to transmit a sequence of radio signals from the vehicle proportioned to the speed of the vehicle and the movement of the first map, a second and similar movable strip map constructed and adapted for location at a ground depot, a radio receiver at such depot, means controlled by the received signal from the transmitting means on the vehicle to move the second map in synchronism with the movement of the first map and a second means at the depot to indicate the position of the vehicle in reference to the said second map, the radio transmitter having means to transmit a signal always of constant time duration but of a varying time lapse period, the time lapse period being proportioned to the speed of the vehicle and the advance movement of the first strip map.

5. In a device as described, a vehicle having a first movable strip map with a first position indicating means associated with such map, means to move the map proportionate distances to the travel of the vehicle, means to transmit radio signals with a frequency of timing proportioned to the speed of the vehicle and to the advancement of the map.

6. In a device as described, a vehicle having a first movable strip map with a first position indicating means associated with such map, means to move the map proportionate distances to the travel of the vehicle, means to transmit radio signals with a frequency of timing proportioned to the speed of the vehicle and to the advancement of the map, a radio receiver at a ground depot, a second and similar movable strip map with a locating means associated therewith at the depot and means controlled by the radio signal received at the depot to move the second map amounts similar to the movement of the first map.

7. In a device as described, a vehicle having a map and a position indicating means for location of the vehicle as to the map, means to relatively move the map and the position indicating means, means to transmit a radio signal controlled by the relatively moving means for the map and the indicator, a second map at a depot with a vehicle position indicating means, a radio receiver at the depot and means controlled by the signal received to relatively move the second map and its indicating means to show the same position of the vehicle on the second map as on the first map.

8. In a device as described, a vehicle having a map and a position indicating means for location of the vehicle as to the map, means to relatively move the map and the position indicating means, means to transmit a radio signal controlled by the relatively moving means for the map and the indicator, a second map at a depot with a vehicle position indicating means, a radio receiver at the depot and means controlled by the signal received to relatively move the second map and its indicating means to show the same position of the vehicle on the second map as on the first map, the radio transmitter having a circuit closing means with a constant time control to maintain such circuit closed for the same period at each closure and means to operate the circuit closer at variable frequencies depending upon the relative speed changes of the first map and the first position indicating means.

9. In a device as described, a vehicle having a movable strip map with a vehicle position indicating means associated with the map, means to move the map in a step by step manner, a radio transmitter, means to transmit signals therefrom timed with the step by step movement of the map.

10. In a device as described, a vehicle having a movable strip map with a vehicle position indicating means associated with the map, means to move the map in a step by step manner, a radio transmitter, means to transmit signals therefrom timed with the step by step movement of the map, a second movable and similar map at a depot with a vehicle position indicating means, a radio receiver at the depot for the transmitted signal and means controlled by the received radio signal to move the second map in a step by step manner in synchronism with the movement of the first map.

11. In a device as described, the combination of a cabinet having a window, a strip map, means to move the map with the face side thereof in the cabinet and exposed through the window, the cabinet window having graduations thereon indicating distances proportionate to that of the map, the map having a center band indicating the line of travel of a vehicle and the window having a rotatable protractor, the center of which aligns with the center of the center band of a map.

12. In a device as described, the combination of a cabinet having a window with means to indicate a position of a vehicle, a map having a center band showing the route of travel of a vehicle and means to move the map whereby the position indicator aligns with places over the map conforming to the location of the vehicle in relation to the ground over which it is travelling.

13. In a device as described, the combination of a cabinet having a window with means to indicate a position of a vehicle, a map having a center band showing the route of travel of a vehicle and means to move the map whereby the position indicator aligns with places over the map conforming to the location of the vehicle in relation to the ground over which it is travelling, the map having lineal distances marked thereon and visible through the window together with elevational contours presented in section and visible through the window, the window having a transverse scale of distances to intersect the longitudinal distance measurements of the map and a protractor rotatable on the center defined by the vehicle position indicator on the window and the center line of the band indicating the travel of the vehicle.

14. In a device as described, the combination of a cabinet with a window and reels with a strip map wound thereon, a feed means for the map, means to guide a section of the map located between the reels inside the window in a position for observation, means to intermittently shift the map, the map having a band thereon with designations of radio navigation beams and radio beacons, the center line of the band having the compass direction of a sequence of radio beams whereby in the movement of the map the sequence of radio beams to be followed by an aeroplane aligns with the center line of the window.

15. In the art described in which a vehicle and a depot each are provided with a movable map of the ground over which the vehicle is to travel and each with an indicating means of the position of the vehicle relative to the map, the vehicle having a radio transmitter and the depot a radio receiver, the method consisting of in the vehicle moving the map at a rate proportionate to the speed of the vehicle over the ground and indicating on the map the position of the vehicle, periodically transmitting a radio signal from the vehicle, the frequency of repetition being proportioned to the movement of the map, at the depot receiving such radio signal, moving the map at the depot distances proportionate to the movement of the map on the vehicle and indicating on the depot map the position of the vehicle thereby locating the place on the ground over which the vehicle is operating.

16. In a device as described an aeroplane, a map on the aeroplane of the ground over which the aeroplane travels, means to move the map at a rate proportionate to the speed of the aeroplane over the ground, an indicating means associated with the map designating the position of the aeroplane relative to the map, means for periodically transmitting a radio signal from the aeroplane with the frequency of the repetition of transmission related to the movement of the map, a depot, a second and similar map at such depot, means to receive the radio signal at such depot, means to move the second map at a rate dependent on the frequency of the repetition of the radio signals to thereby move the second map distances proportionate to the movement of the first map, a position indicating means associated with the second map to designate the position of the aeroplane on the second map in accordance with the position indicated on the first map and hence the position of the aeroplane to the ground over which it travels.

17. In a device as described, the combination in a vehicle of a movable strip map with a vehicle position indicating means associated with the map, an electro-mechanical means to move the map, a radio transmitter, a circuit closer having a connection to the electro-mechanical map moving means and to the radio transmitter with means synchronizing the map moving means and circuit closer for energizing the radio transmitter in conjunction with the moving of the map for the transmission of a radio signal.

EUGENE WILLIAM HAWK.